Dec. 20, 1932.  C. H. WHITE  1,891,488
MULTIPLE ROW PLANTER
Filed Sept. 19, 1927  3 Sheets-Sheet 2

Inventor.
Charles H. White
By John L. Jackson
Attorney.

Witness
Milton Lenoir

Dec. 20, 1932.                    C. H. WHITE                    1,891,488
                              MULTIPLE ROW PLANTER
                           Filed Sept. 19, 1927          3 Sheets-Sheet 3

Witness
Milton Lenoir

Inventor,
Charles H. White
John L. Jackson
    Attorney

Patented Dec. 20, 1932

1,891,488

UNITED STATES PATENT OFFICE

CHARLES H. WHITE, OF MOLINE, ILLINOIS, ASSIGNOR TO DEERE & COMPANY, OF MOLINE, ILLINOIS, A CORPORATION OF ILLINOIS

MULTIPLE ROW PLANTER

Application filed September 19, 1927. Serial No. 220,473.

The present invention relates to planting implements of the multiple row type, i. e. those employing two or more furrow opening units.

One of the particular features of the invention pertains to the manner of operating the seed dropping valve mechanism in implements of this type, so as to obtain maximum accuracy in check-row planting. As is well known, it is very desirable to secure accurate checking in corn planting, so that cross cultivation can be easily performed.

In multiple row planting implements it is advantageous, in order to obtain uniform depth of planting, that the furrow openers or planter units be capable of rising and falling independently of each other so that each unit can adapt itself to variations in the surface of the ground. This is well illustrated in the case of three row planting implements—viz; when traveling astraddle a ridge or furrow the center unit of such implement should be capable of assuming a different vertical height than the lateral units, otherwise certain of the furrow openers may cut their seed furrows too deep or too shallow or not at all. Because of the frequent rise and fall of the planter units in the travel of the implement over the ground it is particularly difficult to transmit accurately timed movement from the check fork simultaneously to all of the seed dropping mechanisms of the several planter units, so that all of the hills of seed will be deposited in desired predetermined relation with respect to the button on the check wire.

According to the present invention, a high degree of checking accuracy is obtained by a unique arrangement of parts which transmit the operating movement between the check fork and the seed-dropping valve mechanisms of the several planter units in such manner that the up-and-down movement of the planter units cannot cause operation of the seed-dropping valve mechanisms, nor cause any movement of the valve operating parts which would affect the normal operating relation between the check fork and the valve mechanisms.

As another feature contributing to this same end, I have also arranged the mechanism which drives the seed plates or seed-feeding devices of the planter units so that the up-and-down motion of the planter units will not affect the normal operating relation of these seed plates.

I have illustrated the invention embodied in a three row planter arranged for tractor propulsion, but it will be understood that the foregoing features of the invention can be embodied with equal advantage in horse drawn planters and can also be embodied in planters employing two, three, or any number of planter units.

Another feature of the invention having particular application to the tractor propelled embodiment thereof, is the mounting of the planter units on a frame which is pivotally supported at its front end on the tractor and which is supported at its rear end on caster wheels. The pivotal attachment of the planter frame to the tractor is on a horizontal pivot axis located considerably forward of the rear end of the tractor to the end that: the planter units will be hitched close to the tractor; the operator can observe and actuate the planter units from his seat on the tractor; the fore-and-aft inclination of the tractor in passing over uneven ground will have minimum effect on the planter; and the planter will be compelled to follow accurately the path of travel of the tractor.

Another feature of the tractor propelled embodiment of the invention is the provision of improved driving mechanism for operating the seed feeding plates, which derives its power from the engine on the tractor. Other features and advantages of the invention will be apparent from the following description thereof. In the accompanying drawings illustrating the invention:

Figure 1:
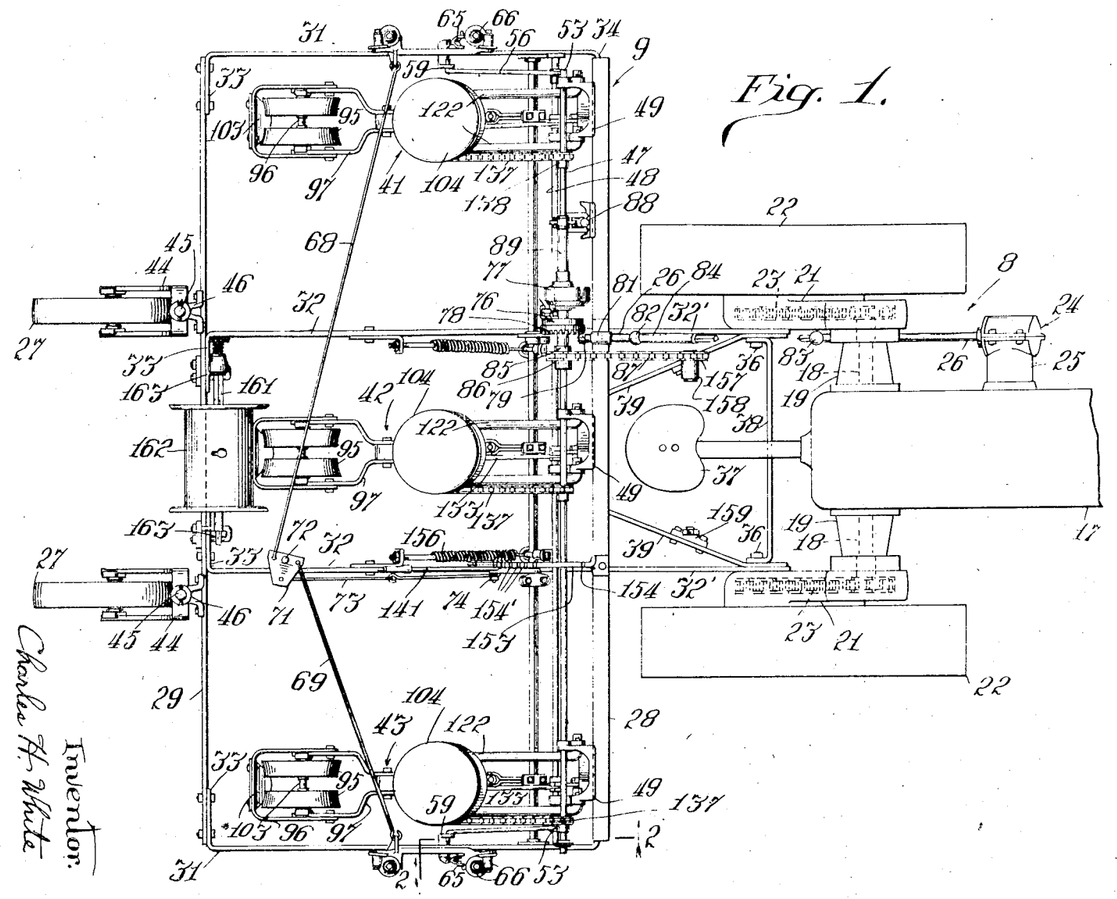
Figure 1 is a plan view showing the planting implement connected to the tractor.

In Figure 1, the rear portion of the tractor is indicated at 8 and the planter attachment is indicated in its entirety at 9. In so far as some of the broad features of my invention are concerned, the implement may be constructed for attachment to any preferred type of tractor. However, to the end of obtaining the hitch connection and the power take-off referred to above, I have, in the present embodiment, shown a particular construction and relation of tractor and implement whereby these other features may be obtained. The engine is supported at the front end of the tractor (not shown) and is operatively connected to the drive wheels of the tractor through any suitable driving train, comprising the usual control clutch, selective speed transmission mechanism and differential, the details of which form no part of the present invention, and hence have not been shown. It will suffice to say that the transmission mechanism and differential are enclosed in a housing 17 which constitutes the rear part of the tractor frame. Shafts 18 extend laterally from the differential through housing extensions 19, which are mounted on the sides of the main housing 17. Extending downwardly and rearwardly from the outer ends of the laterally extending housings 19 are wheel-supporting housings 21, in which are journaled the stub shafts for the tractor drive wheels 22. A chain drive 23 confined within each housing 21 transmits the power from the outer end of each differential shaft 18 to its associated traction wheel 22.

A power take-off device 24 is operatively connected to be driven by the engine of the tractor, such power take-off device comprising a gear housing 25 disposed on one side of the main housing 17, and from which a power take-off shaft 26 extends rearwardly to the implement. The shaft 26 has geared connection within the housing 25 with a shaft (not shown) which extends laterally into the main housing 17. Here this latter shaft has operative connection with the tractor driving train at a point between the control clutch and the driven shaft of the selective speed driving mechanism, i. e., at a point where the rotation of the laterally extending shaft will be governed by the control clutch referred to above, but which rotation will be at a speed independent of the speed selections made in the transmission mechanism. It will hence be seen that the power take-off shaft 26 will revolve at a speed directly proportional to the engine speed, independently of any speed selections made in the transmission mechanism; also that this power take-off shaft will be stopped and started with the operation of the main control clutch.

Figure 2:
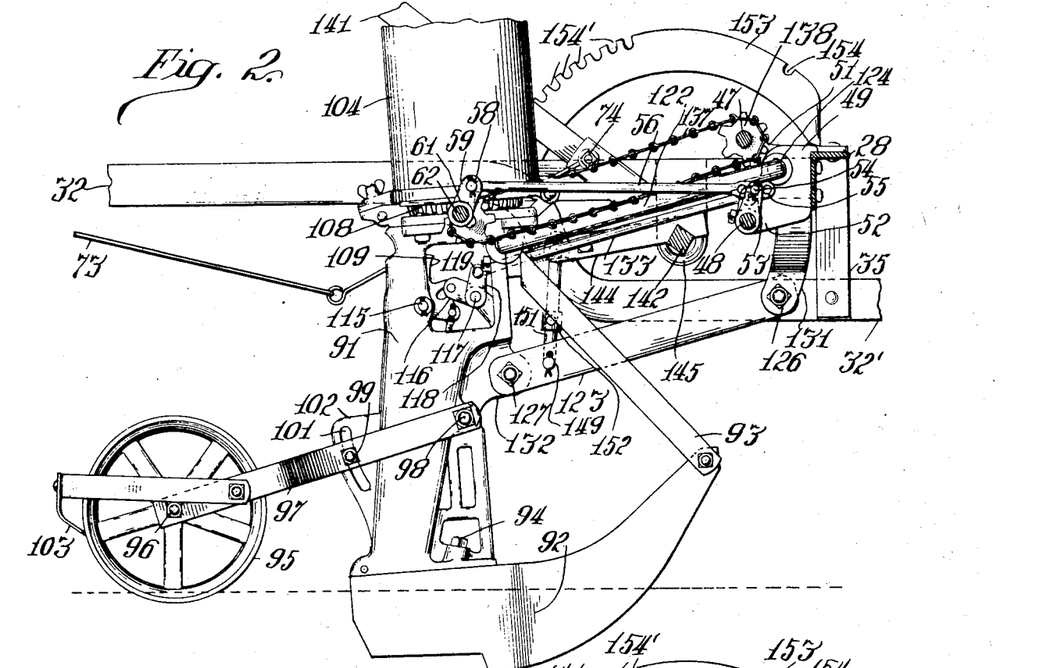
Figure 2 is a longitudinal sectional view taken approximately on the plane of the line 2—2 of Figure 1, showing one of the planter units and its link mounting in side elevation.

The planter attachment comprises a rectangular frame extending transversely across the rear end of the tractor and having its front end pivotally supported on the tractor for vertical pivotal movement relative thereto. The rear end of the frame has wheel support on caster wheels 27 which permit this end of the frame to caster freely in either direction with the turning of the tractor and the backing thereof. The frame is constructed of front and rear cross bars 28 and 29 which are connected fore-and-aft by two outer side bars 31, and by two intermediate bars 32. The rear ends of the four longitudinal bars 31—32 are bent laterally and are rigidly secured to the transverse rear bar 29, as indicated at 33. The front cross bar 28 is of angle cross section, and the front ends of side bars 31 are bent inwardly and suitably secured thereto, as indicated at 34 in Figure 5. The forward portions of the two intermediate bars 32 are dropped slightly as shown in Figure 2 and are secured to the front cross bar 28 by brackets 35. From this point, the intermediate bars extend forwardly to form draft extensions 32' which have pivotal attachment to the inner sides of the wheel supporting housings 21 on pivot pins or bolts 36. This hitch connection between the tractor and the implement permits the rear end of the implement to rise and fall independently of the tractor, but compels the implement to swing laterally as a substantially rigid extension thereof in the steering movement of the tractor. By virtue of the particular construction of the tractor above described, it will be noted that the horizontal axis of this hitch can be placed relatively far forwardly with respect to the tractor approximately in line with the axis of the wheels 22, so that fore-and-aft tilting of the tractor will have minimum effect on the implement. Such hitch also affords two widely spaced points of pivot attachment between the tractor and implement. Moreover, it places the implement in close proximity to the rear end of the tractor where the planter units will have minimum side swing with the steering of the tractor, and where the operator, from his position on the tractor seat 37, can readily effect the lifting of the planter units and can observe their operation. The draft extensions 32' are braced by a transverse bar 38, and by diagonal brace bars 39 extending rearwardly to the front cross bar 28 of the implement.

Pivotally mounted for vertical swinging movement in the implement frame are three planter units 41, 42, and 43, with the center unit disposed directly in rear of the tractor and the two lateral units spaced therefrom the width of a planting row, which disposes these lateral units beyond the tread of the tractor drive wheels 22. Although I have shown three of such planter units, it will be obvious that a greater or less number may be employed if desired. As will hereinafter appear, each of these so called "planter units" embraces the usual furrow opener, seed hopper, feeding plate, seed dropping valve mechanism and covering wheel. The two caster wheels 27 are so mounted on the frame that they can swing through a complete revolution under the rear frame bar 29 and clear the planter units, thus permitting these caster wheels to assume any angular position with respect to the frame in the backing or turning of the implement. Each caster wheel is pivotally supported in a yoke 44 which has swivel pin mounting 45 in a bracket 46 secured to the frame bar 29.

Figure 3:
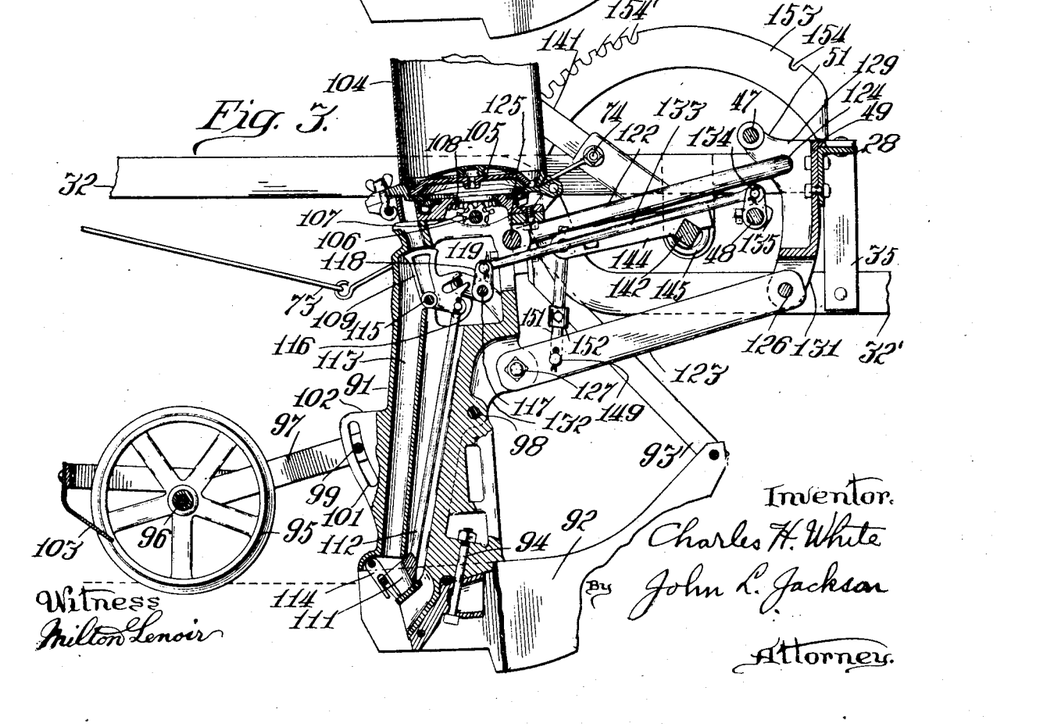
Figure 3 is a similar view showing the planter unit in vertical section.
Figure 5:
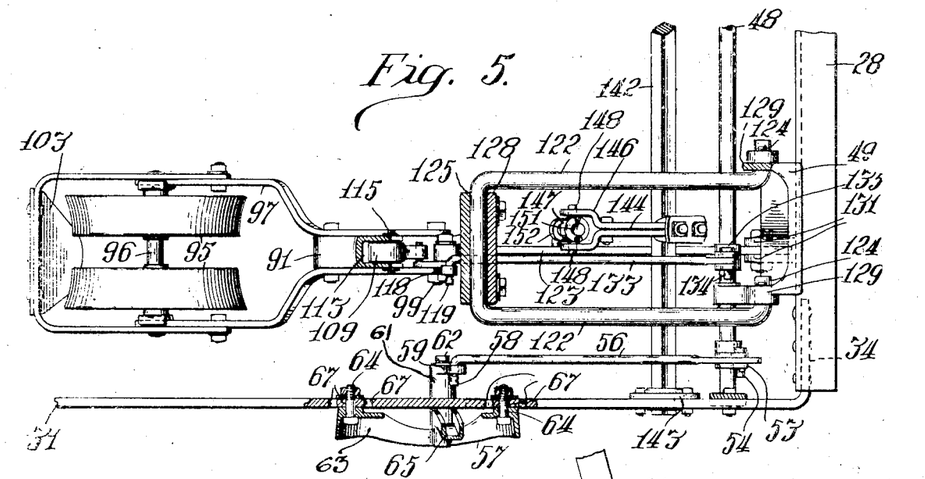
Figure 5 is a horizontal sectional view illustrating the link mounting of each planter unit, and the adjustable mounting of each check head.

Extending transversely across the front of the implement frame in advance of the planter units are two shafts 47 and 48, through which the desired operating motions are transmitted to the feeding plates and to the seed dropping valve mechanisms respectively of all three planter units. The two shafts have bearing support in three brackets 49 which are bolted to the front frame bar 28 directly in line with the three planter units 41, 42, and 43. Referring to Figures 2 and 3, each bracket has a bearing arm 51 extending rearwardly from one side of the bracket, in which arm the upper shaft 47 is journaled. Extending rearwardly from the opposite side of each bracket is another arm 52, in which the lower shaft 48 is journaled. Secured to the opposite ends of the lower shaft 48 are crank arms 53, both of which carry pivot pins 54 adapted for engagement in holes 55 in the forward ends of links 56. Both links 56 extend rearwardly from the opposite ends of the shaft 48 and have operative connection with individual check-heads 57 mounted on the side bars of the frame. Fig. 5 illustrates one of these check-heads in section, and it will be noted the rear end of each link 56 has pivotal connection at 58 with an arm 59 extending upwardly from an oscillatory sleeve 61. Said sleeve has bearing support on a stub shaft 62 extending inwardly from the check-head. Each check head comprises a mounting bracket 63 which is secured to the frame bar 31 by two spaced bolts 64, it being noted that the check-heads are mounted substantially in the transverse plane of the planter units. The stub shaft 62 extends inwardly from the bracket 63, and projecting upwardly from the sleeve 59 is the usual check fork 65 adapted for cooperation with the check wire. The heads comprise the usual arrangement of rollers 66 (Fig. 1) for guiding the check wire through the fork 65, such construction following conventional check-head design.

It will be noted that the frame bar 31 is provided with a plurality of spaced holes 67 for receiving the bolts 64, so as to permit the check-head to be shifted longitudinally along the frame bar to different fore-and-aft positions. The purpose of this adjustment is to enable the operator to set the check-head, including the check fork, forwardly or rearwardly to secure an earlier or later actuation of the check valves, whereby to compensate for different speeds of travel of the implement, the length of the wire used across the field or for other factors which might influence the cross registration of the sets of hills. Referring to Figure 2, it will be seen that the front end of the link 56 is provided with a series of holes 55, equal in spacing to the holes 67, for permitting the effective length of the link 56 to be increased or decreased with the different mountings of the check-head, so that the crank arm 53 shall be retained in the same normal position with each different setting of the check-head.

Referring to Figure 1, it will be seen that each check-head is provided with any suitable arrangement of doffing mechanism for releasing the check wire at the ends of the field. Such doffing mechanism comprises links 68 and 69 which extend inwardly from the heads to an oscillatory plate 71. The latter is pivoted at 72 on the frame of the implement, and extending forwardly from one corner of the plate is a jointed link 73 which has pivotal connection at 74 with the lifting lever through which the planter units are raised and lowered, out of and into their operative positions. The arrangement is such that the raising of the planter runners to their inoperative positions will automatically doff the check wire through the links 73, 68 and 69. Any suitable marker arms may be pivotally supported on the rear corners of the implement frame, for making a marking furrow at either side of the implement.

It will be apparent from the foregoing description that when the buttons on the check wire strike the check fork 65 at either side of the implement, the lower shaft 48 will be oscillated through the operating connection afforded by the arms 59—53 and their connecting link 56. Such rocking movement of the shaft 48 serves to operate the seed-dropping valves of the planter units through actuating linkage which I shall presently describe. Such check shaft 48 has the usual operating relation with respect to the feed shaft 47, corresponding to conventional planter construction, i. e., with each oscillation of the check shaft 48, the feed shaft 47 is energized to move through a short interval of rotation for feeding the desired amount of seed kernals to the aforesaid seed dropping valve mechanisms, preparatory to the next check-wire oscillation of the lower shaft 48. This operating relation between the two shafts is obtained through a conventional type of trip clutch 76 and through a conventional type of variable speed mechanism 77 (Figure 1). Inasmuch as both of these mechanisms are old and well known, it is not necessary to describe the same in detail. The feed shaft 47 requires to be driven from a source of energy, for actuating the several seed plates of the planter units, and in the present tractor propelled planter this shaft is driven from the power take-off device 24 of the tractor. The trip clutch 76 comprises a continuously rotating element, on one side of which is formed a bevel gear 78. Meshing with said gear is a bevel pinion 79 which is mounted on the rear end of the power take-off shaft 26. Directly in front of the pinion, the shaft has support in a bearing bracket 81 which is secured to the front frame bar 28. A universal joint 82 is interposed in the shaft 26 in front of such bearing bracket, and a second universal joint 83 is interposed in the shaft in proximity to the power take-off device 24. A telescopic coupling 84 is also interposed in the shaft at any suitable point between the two universal joints. This telescopic coupling together with the two universal joints accommodates any vertical tilting between the tractor and the implement.

Secured to the continuously rotating bevel gear 78 is a sleeve 85, rotatably mounted on the shaft 47, and secured to said sleeve is a sprocket wheel 86 over which passes a forwardly extending drive chain 87. This chain transmits power to the reel for winding up the check wire, as will be presently described. The swinging lever 88, which is shown as having operative connection with a sleeve 89 extending from the other side of the variable speed unit 77, is the manually actuated control member through which the different speed selections for driving the seed plate operating shaft 47 are made.

The three planter units 41, 42, and 43 are all duplicates and hence a description of one will suffice for all. Each unit comprises a substantially vertical shank 91 which constitutes the main supporting member of the unit. As will hereinafter appear, said shank has linked connection with the implement frame so that the planter unit can rise and fall relative to the frame in adapting itself to uneven ground. Secured to the lower end of the shank is a furrow opener 92 which is preferably, but not necessarily, of the runner type. The upwardly curved front end of the runner is braced to the shank by a diagonal brace bar 93, and the rear end of the runner is secured to the shank by a bolt 94 (Figure 3), this rear end having laterally divergent side walls for opening a seed furrow of the desired width. The depth of the seed furrow is controlled by the setting given the two covering wheels 95 which are adjustably supported on the shank 91. As shown in Figure 1, these covering wheels are mounted side by side on a shaft 96 which is carried in a yoke 97. The two side arms of such yoke extend forwardly on opposite sides of the shank and have pivotal mounting on a bolt 98 extending through the front edge of the shank. A second bolt 99 passes between the arms of the yoke and through a slot 101 formed in a wing 102 projecting rearwardly from the shank, this slot being curved on an arc having the pivot bolt 98 as its center. It will be evident that by loosening the bolt 99, the wheels 95 may be swung upwardly or downwardly so as to regulate the depth to which the furrow opener will penetrate the soil. Such wheels also function as covering wheels, by pressing the earth at each side of the furrow back into the furrow over the seed planted therein. 103 indicates any suitable form of scraper blade for removing clods of earth from the covering wheels.

Each planter unit preferably although not necessarily carries its own seed hopper. In the construction shown, the individual hopper 104 for each unit is mounted on the upper end of the shank 91. The discharge of the seed from the hopper 104 down into the seed furrow is controlled by the seed feeding or selecting plate, and also by the seed dropping valve mechanism hereinbefore referred to. The seed selecting plate is indicated at 105 (Figure 3), being located at the bottom of the hopper 104, and driven from a transverse shaft 106 through gears 107 and 108. This seed selecting plate needs no detailed description as it is well known. The shaft 106 has bearing support in the upper end of the shank 91, so that it rises and falls with the planter unit in the vertical movement of the latter. The seed dropping valve mechanism comprises an upper valve 109 and a lower valve 111, both operatively connected together through a link 112 extending down through an opening in the runner shank. The seed kernels discharged by the selecting plate 105 fall upon the upper valve 109, from whence they drop down through a passageway 113 in the shank to the lower valve 111. Here they are held against a valve gate 114, which is actuated with each operation of the valve mechanism to drop the accumulation or hill of seeds into the furrow. Such type of valve mechanism is well known and the foregoing will therefore afford sufficient explanation of the operation thereof. The upper valve 109 oscillates around a pivot 115, receiving its operating impulse from a crank arm 116 having a crank pin engaging in a slotted portion of the valve. The crank arm 116 is mounted on a short pivot shaft 117 having bearing support in the upper end of the runner shank, whereby the shaft 117 rises and falls with the vertical movement of the planter unit.

Also mounted on the shaft 117, or formed as a bell crank extension of the arm 116, is an arm 118 having a pivot pin 119 at its end, through which motion is transmitted to the seed-dropping valve mechanism.

Each planter unit is mounted on the implement frame through upper and lower parallel links 122 and 123. The front end of the upper link 122 has pivotal connection with the bracket 49 on a pivot axis 124, and the rear end of said link has pivotal connection with the planter unit on a pivot axis 125. The lower link 123 has pivotal connection at its front end to the bracket on a pivot axis 126, and at its rear end to the planter unit on a pivot axis 127. The two upper and lower pivots are equally spaced at opposite ends of the links, and the links are of equal length. Thus the planter unit is free to rise and fall relative to the main frame in adapting itself to the contour of the ground, and in such up-and-down movement the unit is held at all times in the same angular relation to the vertical. This is of advantage as it prevents fore-and-aft tilting of the planter unit, which would result in inaccuracies in the cross check. Referring more specifically to the construction of the parallel links, it will be noted from Figure 5 that the upper link 122 is of U-shaped form, having the cross portion thereof rotatably mounted in a long bearing block 128 which is secured to the front of the shank 91. The ends of the link are bent laterally and have widely spaced bearing support in bosses 129 carried by the bracket 49. The considerable length of bearing support of the runner shank on the link 122 and the widely spaced points of bearing support of such link on the bracket 49, firmly brace the planter unit against lateral tipping. The lower link 123 consists of a single bar, pivoted at its front end between two spaced arms 131 extending down from the bracket 49, and pivoted at its rear end to a lug 132 projecting from the runner shank.

The transmission of the intermittent rocking or oscillatory movement of the check shaft 48 to the check valve mechanism of the planter unit is effected through motion transmitting means which extends substantially in parallelism with the two parallel links 122—123. In the construction shown, this motion transmitting means consists of an oscillating link 133, although it will be evident that when employing other characteristic operating movements it might consist of a rotating or oscillating shaft, or the like. Referring to Figure 3, the rear end of this link is pivotally connected to the pivot pin 119 in the valve operating arm 118. The front end of the link is pivotally connected to a pivot pin 134 in the end of an operating arm 135 secured to the check shaft 48. Attention is directed to the fact that the axes of the two pivot pins 134 and 119 occupy the same relative positions with respect to the adjacent pivot axes of the parallel links 122—123. Preferably, the axes of the shafts 48 and 117 also occupy the same relative positions with respect to the adjacent pivot axes of the parallel links 122—123. Hence, the valve operating link 133 constitutes a third link in the parallelogram system of links, having the same swinging movement as the two supporting links 122—123 in the rise and fall of the planter unit. It will therefore be seen that the vertical movement of the planter unit cannot effect operation of the check valve mechanism, nor can it vary the normal angular relation between the two valve operating arms 135 and 118 and thereby disturb the normal timed or operating relation between the check forks 65 and the seed dropping valve mechanism.

The rotating motion of the feed shaft 47 on the frame is transmitted to the feed shaft 106 on the planter unit through motion transmitting means which also has this characteristic of swinging in parallelism with the parallel mounting links 122—123. In this instance, the motion transmitting means comprises a chain 137 which passes over sprocket wheels 138 and 139 mounted on the shafts 47 and 106 respectively. These shafts also occupy the same relative positions with respect to the pivot axes of opposite ends of the parallel links 122—123. Hence, the chain 137 also swings in parallelism with the parallel links. The foregoing arrangement of valve operating mechanism (118—133—135) and seed plate operating mechanism (137—138—139) applies, of course, to all three planter units 41, 42 and 43.

Figure 4:
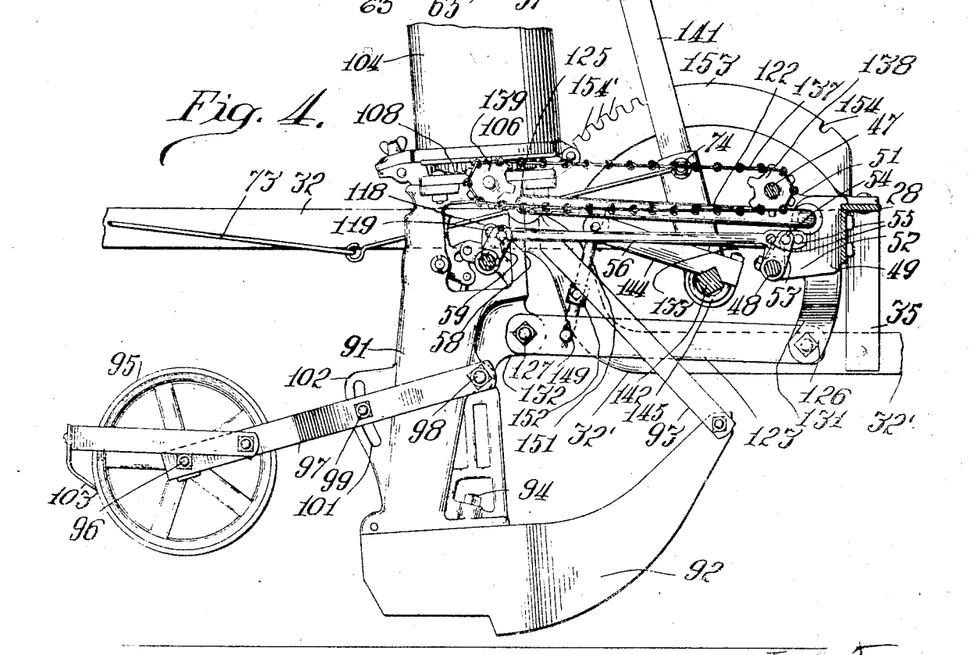
Figure 4 is a view similar to Figure 2 showing the planter unit in raised position.

The planter units are adapted to be raised clear of the ground, as when turning at the ends of the field and for transport, through a lifting lever 141 which is disposed in convenient position to the operator on the tractor seat 37. Said lever is secured to a square shaft 142 which extends transversely across the front of the implement frame and has its ends journaled in bearings 143 (Figure 5) carried by the side bars 31. Secured to such shaft, in line with each planter unit is an arm 144, the latter having a notch in its under side which is secured over the square shaft by a U-bolt 145. The arm consists of two parallel bars having their rear ends separated to form a fork 146. A collar 147 is rockably supported in such fork by trunnion pins 148. Pivotally connected at 149 to the lower mounting link 123, is a lifting link 151 which passes upwardly through the collar 147. A stop pin or collar 152 is secured to the lifting link adjacent the lower end thereof, being positioned so that the planter unit is capable of moving down to a relatively low position, corresponding to a maximum depth of furrow in a depression in the ground, without having the stop 152 strike the collar 147. In the operation of the lifting lever 141, this lost motion is all taken up in the first part of the lever movement and, thereafter, with the stop 152 engaging the collar 147, the planter unit will be raised from the ground, as illustrated in Figure 4. Any suitable latching dog on the lever 141 cooperates with a suitable latching quadrant 153 for holding the lever in its different positions. When the planter units are to be raised to their transport positions, the lever is swung forwardly to have its latch mechanism engage in a notch 154 at the front end of the quadrant. One or more tension springs 156 (Figure 1) are suitably connected to an arm or arms (not shown) extending down from the lifting shaft 142, for partially counter-balancing the weight of the planter units. When the planter units are engaging in the ground it is desirable that the lifting shaft 142 be rigidly locked to the frame so that the tension of the springs 156 will not be effective on the planter units tending to lift the same. To this end, the rear portion of the latching quadrant 153 is provided with a series of notches 154' for locking the lever 141 in different positions, the lost motion occurring between the collar 147 and link 151 permitting each planter unit to rise and fall through a considerable range independently of the locked condition of the lever.

Referring to Figure 1, the drive chain 87 extends forwardly from the sprocket wheel 86 and passes over a sprocket wheel 157 mounted on a driving socket 158 which has suitable bearing support on the diagonal brace 39. Directly opposite this driving socket, is a bearing socket 159 which is mounted on the other brace bar 39. The two sockets form a mounting adapted to receive the shaft ends 161 of the check wire reel 162. The reel is adapted to be mounted in these sockets when the check wire is to be wound upon the reel, the latter being then driven through the chain 87 under the control of the tractor clutch. It will be noted that by virtue of this power drive of the reel, the check wire can be wound thereon with the implement remaining stationary. When the check wire is to be unwound from the reel, the latter is mounted in bearing sockets or brackets 163 which are secured to the rear frame bar 29.

It will be seen from the foregoing that the three planter units are capable of moving upwardly and downwardly relative to the implement frame, either collectively or independently of each other, in traveling across uneven ground or along a ridge or furrow; and that such movement of the planter units cannot disturb the normal operating relation of the valve mechanism. The "normal operating relation" referred to is that desired relation of the parts whereby when the check fork has been swung back through a predetermined movement by the button on the check-wire, the seed dropping valve mechanism will also have been moved through a predetermined distance, corresponding to a dropping of the seed at a precise point in the movement of the check fork. It is this normal operating relation which it is desirable to maintain, irrespective of the rise and fall of the planter unit, and such is maintained by the construction above described. Attention is also directed to the fact that the planting implement can be attached to and detached from the tractor in a short length of time, only requiring connection or disconnection of the hitch pivots 36 and of the power take-off shaft 26.

What I claim as my invention, and desire to secure by Letters Patent, is:

1. In a planting implement, the combination of a frame, a planter unit comprising seed dropping mechanism, means for connecting the planter unit with said frame arranged whereby said unit is free to rise and fall relative to said frame while being maintained in its same angular relation to the vertical, operating mechanism for said seed dropping mechanism mounted on said frame, and motion transmitting means connecting said operating mechanism with said seed dropping mechanism comprising a rigid reciprocable member arranged to move substantially in parallelism with said connecting means in the rise and fall of said planter unit.

2. In a planting implement, the combination of a frame, a planter unit comprising seed dropping mechanism, parallel link mechanism connecting said planter unit with said frame for up and down movement relative thereto, and means for operating said seed dropping mechanism comprising a reciprocable rod member swinging substantially in parallelism with said link mechanism in the up and down movement of said planter unit.

3. In a planting implement, the combination of a frame, a planter unit comprising seed feeding and dropping mechanism, means for mounting said planter unit upon said frame so that said unit is free to move up and down, comprising a pair of parallel link members pivotally connected at their opposite ends to said planter unit and said frame, so as to maintain the planter unit in substantially the same relation to the vertical as it moves up and down, means for driving the seed feeding mechanism including operating parts extending and movable in substantial parallelism with said link members, and means for operating said seed dropping mechanism from an operating point on said frame relatively to which said planter unit has vertically swinging movement, said operating means comprising a rigid reciprocable member arranged to move substantially in parallelism with said parallel links.

4. In a planting implement, the combination of a frame, a planter unit comprising seed dropping mechanism, a pair of parallel links pivotally connecting said planter unit with said frame, whereby said unit is free to move up and down relative to said frame while being maintained in substantially its same angular relation to the vertical, an operating shaft extending transversely of said frame and having bearing support thereon, a check-head on said frame operatively connected to said shaft, and an actuating member operatively connected with said shaft and with said seed dropping mechanism and arranged to swing substantially in parallelism with said links in the vertical movement of said planter unit.

5. In a planting implement, the combination of a frame, a plurality of planter units located at spaced points transversely of said frame, a pair of parallel links connecting each of said planter units with said frame, whereby said units are free to rise and fall relative to said frame, seed dropping mechanism associated with each of said planter units, an operating shaft extending transversely of said frame and having bearing support thereon, a check fork mounted on said frame and operatively connected with said shaft, and actuating members arranged to transmit motion between said shaft and each of said seed dropping mechanisms, said actuating members swinging substantially in parallelism with said links in the vertical movement of their associated planter units.

6. In a planting implement, the combination of a frame, a planter unit comprising a furrow opener together with seed feeding mechanism, and seed dropping valve mechanism, means for mounting said planter unit upon said frame comprising a pair of parallel links permitting said unit to rise and fall relative to the frame while maintaining said unit in its same angular relation to the vertical, a first operating member on said frame, motion transmitting means connecting said operating member with said seed feeding means and arranged to swing substantially in parallelism with said links, a second operating member mounted directly on said frame, a check fork operatively connected to said second operating member, and motion transmitting means connecting said second operating member with said seed dropping valve mechanism and arranged to swing substantially in parallelism with said links.

7. In a planting implement, the combination of a frame, a planter unit comprising seed dropping mechanism, a pair of parallel links pivotally connected at their rear ends to said planter unit and at their front ends to said frame, whereby said unit is free to move up and down relative to said frame while being maintained substantially in the same angular relation to the vertical, an operating shaft on said frame in proximity to the front ends of said links, a check fork on said frame connected with said shaft, an arm on said shaft, a pivoted arm on said planter unit connected for operating said seed dropping mechanism, and an actuating link pivotally connecting said arms and extending substantially in parallelism with said parallel links.

8. In a planting implement, the combination of a frame, a plurality of planter units disposed in spaced relation transversely of said frame, each of said planter units comprising seed dropping valve mechanism, means connecting each of said planter units to said frame for independent vertical movement, comprising a pair of parallel links pivotally connected at their forward ends to said frame on vertically spaced pivot axes and pivotally connected at their rear ends to said planter unit on vertically spaced pivot axes, a check shaft extending transversely of said frame adjacent to the forward end thereof, a check fork operatively connected with said check shaft, an arm mounted on said shaft substantially in the plane of each of said planter units, a cooperating arm pivotally mounted on each of said planter units and operatively connected with the seed dropping valve mechanism thereof, and a connecting link extending between each pair of arms and arranged to swing substantially in parallelism with the parallel links of its associated planter unit.

9. In a planting implement, the combination of a frame, a plurality of planter units disposed in spaced relation transversely of said frame, means for mounting each of said planter units on said frame, comprising a pair of parallel links having their front ends pivotally connected to said frame on vertically spaced pivot axes and having their rear ends connected to said planter unit on vertically spaced pivot axes, each of said planter units comprising a seed feeding plate and seed dropping valve mechanism, a driven shaft on each planter unit operatively connected with the seed feeding plate thereof, a cooperating driving shaft on said frame, motion transmitting means connecting said driving shaft with the driven shafts of each of said planter units, a second driven shaft on each of said planter units operatively connected with the seed dropping valve mechanism thereof, a second driving shaft on said frame, a check fork on said frame arranged to oscillate said latter driving shaft, and oscillatory motion transmitting means connecting said second driving shaft with each of said second driven shafts on the planter units, both pairs of driving and driven shafts occupying substantially the same relation to the front and rear pivot axes of said parallel links, whereby both of the motion transmitting means of each planter unit swing substantially in parallelism with the parallel links thereof in the vertical movement of the planter unit.

10. In a planting implement, the combination of a frame, a planter unit, connections for connecting said unit with the frame to cause said unit to move with respect to said frame in a curved path, said connections being such that the radii of curvature of the path of any two spaced points on said planter unit are equal and parallel, said planter unit comprising seed dropping mechanism, an operating member on the frame, and motion transmitting mechanism connecting said operating member and said seed dropping mechanism, including a reciprocable rod of a length equal to said radii and positioned parallel thereto.

11. In a planting implement, the combination of a frame, a planter unit, connections connecting said unit with the frame to cause said unit to move with respect to said frame in a curved path, said connections including a link pivotally connected at one end to the frame and at its other end to the planter unit and means for maintaining said unit in an upright position in all its positions with respect to the frame, said planter unit comprising seed dropping mechanism, an operating member on said frame, and motion transmitting mechanism connecting said operating member and said seed dropping mechanism, including a reciprocable rod of the same length as said link and positioned parallel thereto.

12. In a planting implement, the combination of a frame, a planter unit, connections connecting said unit with the frame to cause said unit to move with respect to said frame in a curved path, said connections being such that the radii of curvature of the path of any two spaced points on said planter unit are equal and parallel, said planter unit comprising two seed dropping mechanisms, a first operating member on said frame, motion transmitting means connecting said operating member with one of said seed dropping mechanisms and including a rod of a length equal to said radii and positioned parallel thereto, a second operating member on said frame, and motion transmitting means connecting said second operating member with said other seed dropping mechanism and arranged to swing in a curved path with its radius being of the same length and parallel to said rod and first named connections.

13. In a planting implement, the combination of a frame, a planter unit, connections connecting said unit with the frame to cause said unit to move with respect to said frame in a curved path, said connections including a link pivotally connecting at one end to the frame and at the other end to the planter unit and means for maintaining said unit in an upright position in all of its positions with respect to the frame, said planter unit comprising seed dropping valve mechanism, a first operating member on said frame, motion transmitting means connecting said operating member with said seed dropping valve mechanism and including a rod of a length equal to said link and positioned parallel thereto, seed feeding mechanism on said planter unit, a second operating member on said frame, motion transmitting means connecting said second operating member with said seed feeding mechanism and arranged to swing in a curved path with its radius being of the same length and parallel with said rod and said connecting link.

14. In a planting implement, the combination of a wheel supported frame, a plurality of independent planter units each having seed dropping mechanism, parallel links for each unit pivoted on the frame and on said unit respectively for directly connecting each unit to the frame whereby each unit is free to rise and fall relative to said frame while being maintained in its same angular relation with respect thereto, and a plurality of means mounted on the frame and connected with each of the seed dropping mechanisms of the planter units for operating said mechanisms, each of said means including a rigid member disposed parallel to said links and pivotally mounted for reciprocable movement at pivot points on the frame and its corresponding planter unit respectively, said rigid member remaining operable and parallel to said links for all positions of the latter as said planter unit rises and falls with respect to the frame.

15. In a planting implement, the combination of a wheel supported frame, a plurality of independent planter units each having seed dropping mechanism, parallel links for each unit pivoted on the frame and on said unit respectively for directly connecting each unit to the frame whereby each unit is free to rise and fall relative to said frame while being maintained in its same angular relation with respect thereto, and a plurality of means mounted on the frame and connected with each of the seed dropping mechanisms of the planter units for operating said mechanisms, each of said means comprising a check-head mechanism supported on the frame substantially transversely of the planter unit, a connecting rod extending in fore and aft direction from the check-head to a pivotal mechanism mounted on said frame substantially adjacent the pivotal connections of said links with said frame, and an operating rod connected parallel to said links between the seed dropping mechanism and the pivotal mechanism for actuating the former, said operating rod being maintained operable and in parallelism to said links for all movements of its corresponding planter unit relative to the frame.

16. In a planting implement, the combination of a frame, a planter unit having seed dropping mechanism, link means having pivotal connections with said frame and unit respectively whereby the latter is free to rise and fall relative to said frame while being maintained in its same angular relation with respect to the frame, and operative means for actuating the seed dropping mechanism of said unit comprising a check-head mechanism supported on the frame substantially transversely of the planter unit, a connecting rod extending in fore and aft direction from the check-head to a pivotal mechanism mounted on said frame substantially adjacent the pivotal connection of said link means with said frame, and an operating rod connected parallel to said link means between the seed dropping mechanism and the pivotal mechanism for actuating the former, said operating rod being maintained operable and in parallelism to said link means for all movements of the planter unit relative to the frame.

17. In a planting implement, the combination of a frame, a planter unit comprising seed dropping mechanism, parallel link mechanism connecting the planter unit with said frame for up and down movement relative thereto, and means for operating said seed dropping mechanism comprising a first oscillatory means mounted on said frame, a second oscillatory means mounted on said planter unit and connected with said seed dropping mechanism, and means connecting said two oscillatory means, both of said oscillatory means being spaced apart a distance equal to the length of said parallel link mechanism and being disposed on a line that is substantially parallel to said link mechanism.

18. In a planting implement, the combination of a frame, a planter unit comprising seed dropping mechanism, parallel link mechanism connecting the planter unit with said frame for up and down movement relative thereto, and means for operating said seed dropping mechanism comprising an oscillatory arm pivoted on said frame, a second arm pivoted on said planter unit and connected with said seed dropping mechanism, and a rod member disposed parallel to said link mechanism and connecting said arms, said rod having substantially the same length as said parallel link mechanism, and said arms being disposed parallel to each other and being of equal length.

CHARLES H. WHITE.